United States Patent
Sun et al.

(10) Patent No.: US 10,612,614 B2
(45) Date of Patent: Apr. 7, 2020

(54) FRICTION MATERIAL COMPOSITION

(71) Applicant: HITACHI CHEMICAL COMPANY, LTD., Tokyo (JP)

(72) Inventors: Shouqi Sun, Tokyo (JP); Akihito Magara, Hachioji (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 16/089,433

(22) PCT Filed: Mar. 28, 2017

(86) PCT No.: PCT/JP2017/012657
§ 371 (c)(1),
(2) Date: Sep. 28, 2018

(87) PCT Pub. No.: WO2017/170560
PCT Pub. Date: Oct. 5, 2017

(65) Prior Publication Data
US 2019/0107164 A1    Apr. 11, 2019

(30) Foreign Application Priority Data
Mar. 29, 2016    (JP) .................................. 2016-065111

(51) Int. Cl.
*F16D 69/02*    (2006.01)

(52) U.S. Cl.
CPC .... *F16D 69/026* (2013.01); *F16D 2200/0069* (2013.01)

(58) Field of Classification Search
CPC .................. F16D 69/026; F16D 69/02; F16D 2200/0069; C09K 3/14
See application file for complete search history.

(56) References Cited

U.S. PATENT DOCUMENTS

| | | | | |
|---|---|---|---|---|
| 2004/0247847 | A1* | 12/2004 | Nagayoshi | F16D 69/026 428/292.1 |
| 2013/0220748 | A1 | 8/2013 | Unno et al. | |
| 2017/0030426 | A1* | 2/2017 | Nagashima | C09K 3/14 |
| 2017/0219037 | A1 | 8/2017 | Yamamoto et al. | |
| 2017/0284491 | A1* | 10/2017 | Unno | F16D 69/02 |

FOREIGN PATENT DOCUMENTS

| | | |
|---|---|---|
| JP | H10-205555 A | 8/1998 |
| JP | 2002-097455 A | 4/2002 |
| WO | 2012/066964 A1 | 5/2012 |
| WO | 2012/066969 A1 | 5/2012 |
| WO | 2015/159848 A1 | 10/2015 |
| WO | 2016/017488 A1 | 2/2016 |

OTHER PUBLICATIONS

Hu J et al. "Computational investigation of microstructural effects on abrasive wear of composite materials", May 10, 2005, pp. 6-17 (cited in a Search Report in counterpart European application dated Oct. 11, 2019).

* cited by examiner

*Primary Examiner* — Alexander C Kollias
(74) *Attorney, Agent, or Firm* — Fitch, Even, Tabin & Flannery, LLP

(57) ABSTRACT

Provided is a friction material composition capable of giving friction materials which, although low in copper or copper-alloy content, have excellent fade resistance at high temperature and give a satisfactory pedal feeling during braking. The friction material composition has a binder, a fibrous base material, an inorganic filler, and an organic filler, and contains no copper or has a copper content of 0.5 mass or less. The inorganic filler contains two γ-alumina powders, i.e., a first γ-alumina powder, which has a median diameter ($D_{50}$) of 0.8-60 μm, and a second γ-alumina powder, which has a median diameter ($D_{50}$) of 80-400 μm.

13 Claims, 1 Drawing Sheet

FRICTION MATERIAL COMPOSITION

CROSS-REFERENCE TO RELATED APPLICATIONS

This application is a U.S. national phase application filed under 35 U.S.C. § 371 of International Application No. PCT/JP2017/012657, filed Mar. 28, 2017, designating the United States, which claims priority from Japanese Patent Application No. 2016-065111 filed Mar. 29, 2016, which are hereby incorporated herein by reference in their entirety.

TECHNICAL FIELD

The present invention relates to a friction material composition which is a raw material of friction materials used for braking of an automobile or the like, and more particularly to a friction material composition containing a binder, a fibrous base material, an inorganic filler and an organic filler.

BACKGROUND ART

Friction materials such as disc brake pads and brake linings are used for the purpose of braking in automobiles and the like. The friction material fulfills the role of braking by friction with a facing material such as a disc rotor, a brake drum or the like. Therefore, it is required for the friction material to have a stability of the friction coefficient (fade resistance) and a high friction coefficient in the braking temperature range which is wide from low temperature to high temperature. In addition, pedal feeling characteristics during braking (shortening of time to stabilization from the start of braking) is required.

Such a friction material contains components such as a binder, a fibrous base material, an inorganic filler and an organic filler, and one kind or two kinds or more in combination are used, in general, for each component in order to develop the above-mentioned characteristics. As the fibrous base material, organic fibers, metal fibers, inorganic fibers and the like are used, and copper fibers and copper alloy fibers are used as the metal fiber for improving wear resistance. Also, so-called non-asbestos friction materials, which do not contain asbestos, are main stream as friction materials. However, for this non-asbestos friction material, a large amount of copper or copper alloy or the like is used (Patent Literature 1, etc.).

CITATION LIST

Patent Literature

Patent Literature 1: Japanese Patent Application Laid-Open No. 2002-97455

SUMMARY OF INVENTION

Technical Problem

In the friction materials containing copper or copper alloy, abrasion powder containing copper is generated at the time of braking, and it is suggested that this may cause contamination of rivers, lakes and oceans. Therefore, there is a growing movement to limit their use. Moreover, in the friction materials which have been developed so far and which are low in the content of copper and copper alloy, it is difficult to achieve both stability of friction coefficient (fade resistance characteristics) at high temperature and pedal feeling characteristics during breaking (shortening of time to stabilization from the start of breaking).

It is therefore an object to provide a friction material composition capable of giving a friction material which is excellent in fade resistance at high temperature and has good pedal feeling characteristics during breaking even if the content of copper and copper alloy is small.

Technical Solution

In order to improve the characteristics of the fade resistance characteristics at high temperature and the pedal feeling characteristics in the case of containing no copper or, even when copper is contained, in the case of an extremely small amount as 0.5 mass % or less, the inventors of the present invention have focused attention on γ-alumina which is one type of inorganic filler, while they have examined the particle size thereof. As a result, it has been found that the fade resistance at high temperature and the pedal feeling characteristics are improved by using γ-alumina having a relatively large particle size and fine γ-alumina having a small particle size together.

The friction material composition of the present invention has been made based on this finding. According to an aspect of the present invention, a friction material composition, comprises: a binder; a fibrous base material; an inorganic filler; and an organic filler, and containing no copper or having a copper content of 0.5 mass % or less, wherein the inorganic filler comprises two γ-alumina powders of a first γ-alumina powder having a median diameter ($D_{50}$) of 0.8 to 60 μm, and a second γ-alumina powder having a median diameter ($D_{50}$) of 80 to 400 μm.

In the friction material composition of the present invention, it is preferred that a content of the first γ-alumina powder is 0.5 to 3.0 volume % and a content of the second γ-alumina powder is 0.5 to 2.0 volume %. Also, it is preferred that the difference in the median diameter ($D_{50}$) between the first γ-alumina powder and the second γ-alumina powder is 139 to 305 μm.

The first γ-alumina powder may contain a fraction classified to a particle diameter of 0.8 to 60 μm at a ratio of 50 volume % or more, and the second γ-alumina powder may contain a fraction classified to a particle diameter of 80 to 400 μm at a ratio of 50 volume % or more. The content of the fraction of γ-alumina classified to a particle diameter of 0.8 to 60 μm is 0.25 to 3.0 volume % of the friction material composition, and the content of the fraction of γ-alumina classified to a particle diameter of 80 to 400 μm is 0.25 to 2.0 volume % of the friction material composition.

The ratio of a fraction of γ-alumina having a particle diameter exceeding 60 μm and less than 80 mμ may be 20 volume % or less to the total amount of the γ-alumina powders contained in the friction material composition. It is possible to blend in such a manner that the ratio of a fraction classified to a particle diameter of 0.8 to 60 μm is 10 to 90 volume % and the ratio of a faction classified to a particle diameter of 80 to 400 μm is 10 to 90 volume %, to the total amount of the γ-alumina powders contained in the friction material composition.

Advantageous Effects of Invention

According to the friction material composition of the present invention, since copper is not contained or, even when it is contained, since it is extremely small as 0.5 mass % or less, it is possible to provide a friction material which is free from the possibility of adversely affecting the environment, and which exhibits a remarkable effect such that it is excellent in fade resistance at high temperature and good in the pedal feeling characteristics during braking.

BRIEF DESCRIPTION OF DRAWINGS

FIG. 1(a) is a graph of Example 1 and FIG. 1(b) is a graph of Comparative Example 1.

MODE FOR CARRYING OUT THE INVENTION

[Friction Material Composition]

Figure 1:
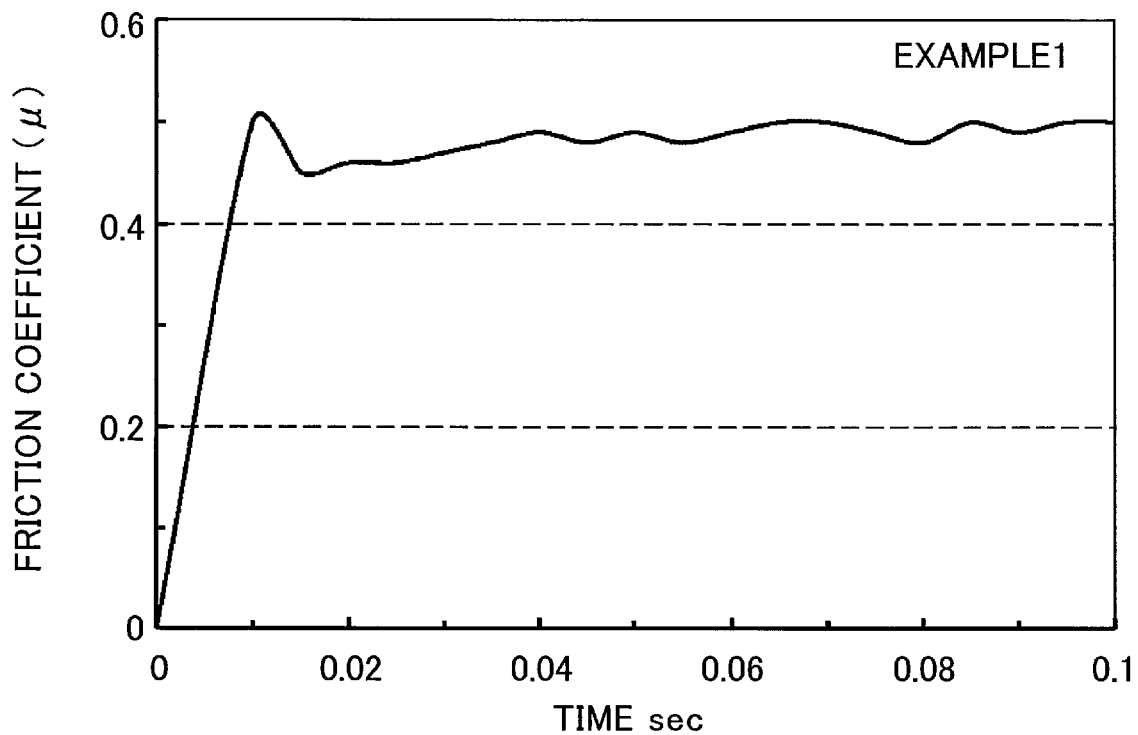
FIG. 1 It is a graph showing a change in friction coefficient (μ) from the start of braking in a test of pedal feeling characteristics.
Figure 1:
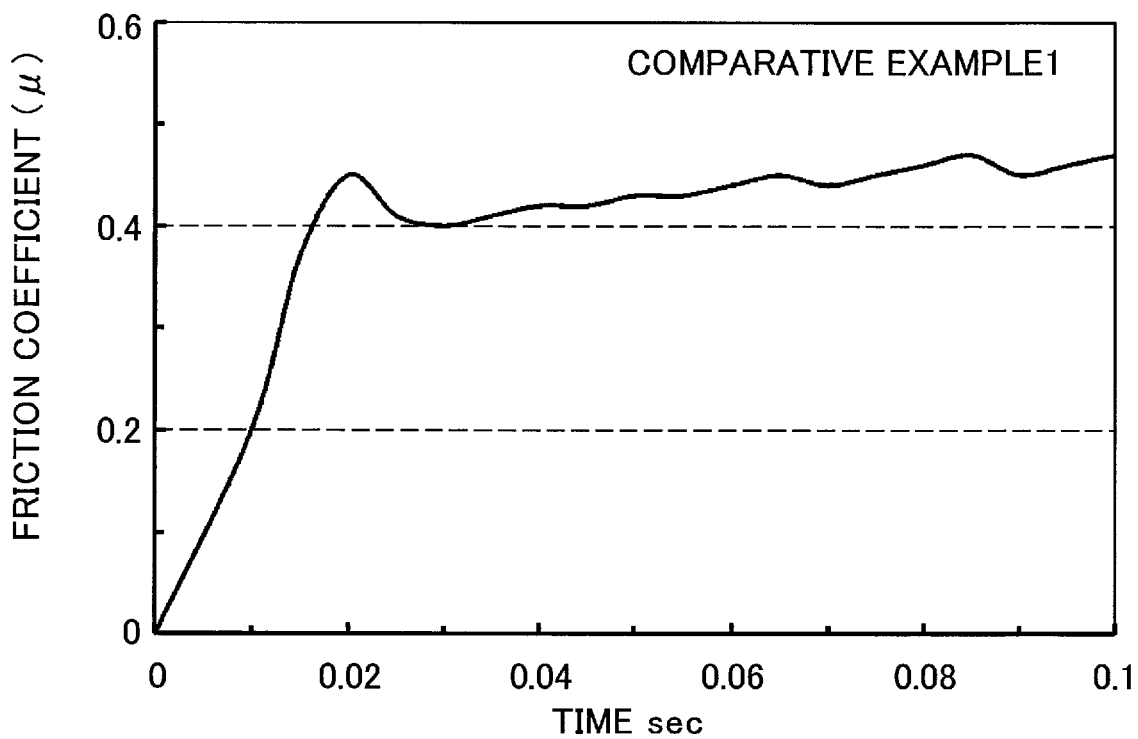

The friction material composition of the present invention is a non-asbestos friction material composition (a friction material composition containing no asbestos or a trace amount asbestos even when it contains) containing a binder, a fibrous base material, an inorganic filler and an organic filler. Each of materials constituting the friction material composition will be specifically described below. The friction material composition of the present invention can be obtained by blending the respective materials, based on the following description to prepare a homogeneous mixture. A friction material such as a brake pad can be obtained by forming and curing it into a desired shape.

(Copper)

The friction material composition of the present invention contains no copper or, even when it contains, an extremely small amount of copper as 0.5 mass % or less. Therefore, there is no fear of polluting the environment. It is preferable that copper is not contained, but in the case of containing it, a simple copper metal or a copper alloy such as bronze, brass or the like can be used in a form of fiber or powdered metal.

(γ-Alumina)

Alumina, that is, aluminum oxide ($Al_2O_3$) is a type of inorganic filler. As the alumina, α-alumina having a high hardness and having a trigonal crystal structure is generally used. However, the friction material composition of the present invention contains γ-alumina (activated alumina) having a cubic crystal structure as an essential component. The γ-alumina has a characteristic that the specific surface area is large and the hardness is lower than that of α-alumina, and it is used as inorganic filler, an abrasive material, an absorbent, and the like. The γ-alumina is obtained, for example, by drying aluminum hydroxide at a low temperature to prepare an alumina gel and then firing it at a temperature of 500 to 800° C., thereby possibly producing γ-alumina of spherical particles.

The inventors of the present invention have examined the particle size of γ-alumina powder and have obtained the following findings. That is, the γ-alumina powder in the friction material composition bites into the disc rotor as the mating member when the particle size is large, so that the fade resistance of the friction material is possibly improved by the scratch resistance. However, under low hydraulic pressure, biting into the disc rotor becomes slight and the friction coefficient at the initial stage of braking is not stable. On the other hand, if the particle size of the γ-alumina powder is small, the friction coefficient at the initial stage of braking can be stabilized quickly because the pore size distribution of the friction material is liable to change. However, since the amount of biting into the disc rotor becomes small, the fade resistance characteristics may be inferior.

From these findings, the inventors of the present invention have examined the possibility by using a γ-alumina powder having a large particle size and a γ-alumina powder having a small particle size in combination, in order to improve the fade resistance characteristics at high temperature and the pedal feeling characteristics. As a result, it has been found that improvement of the fade resistance at high temperature is possible and improvement of the pedal feeling characteristics is also possible, by combining a γ-alumina powder having a median diameter ($D_{50}$) of 0.8 to 60 μm as a first γ-alumina powder having a small particle size with a γ-alumina powder having a median diameter ($D_{50}$) of 80 to 400 μm as a second γ-alumina powder having a large particle size. Here, it is noted that, in the present invention, the median diameter is indicated by the particle diameter ($D_{50}$) at the cumulative distribution of 50 volume %, unless otherwise specified.

(γ-Alumina Powder Having a Median Diameter ($D_{50}$) of 0.8 to 60 μm)

The first γ-alumina powder used in the friction material composition of the present invention, that is, the γ-alumina powder having a small particle size is an active ingredient which is specialized for quickly stabilizing the friction coefficient at the initial stage of braking, and mainly has particles having a particle diameter in a range of 0.8 to 60 μm. When the γ-alumina particles to be incorporated into the friction material composition has a particle diameter of about 60 μm or less, the plastic flow of the friction material becomes easy so that the pore diameter distribution easily changes, which works effectively to stabilize the friction coefficient in the initial stage of braking. However, with particles excessively small of less than 0.8 μm, biting into the disc rotor becomes poor and the fade resistance characteristics deteriorate. Thus γ-alumina particles having a particle diameter in the range of 0.8 to 60 μm are an advantageous ingredient that is possible to quickly stabilize the friction coefficient in the initial stage of braking (that is, to improve the pedal feeling characteristics) without lowering the fade resistance characteristics. If the particle diameter exceeds about 60 μm, plastic flow of the friction material hardly occurs and the pore diameter distribution hardly changes, so that it is difficult to obtain the stabilizing effect of the friction coefficient in the initial stage of braking. In view of the above, it is preferred that the γ-alumina particles having a particle diameter in the range of 0.8 to 60 μm occupy about 50 volume % or more, and more preferably occupy about 75 volume % or more in the first γ-alumina powder. It is optimum to use a fraction classified into a particle diameter rage of 0.8 to 60 μm by powder sieving or the like, as the γ-alumina powder having a small particle size. When assuming a normal distribution type particle size distribution, the proportion of particles having a particle diameter in the range of 0.8 to 60 μm occupying a powder having a median diameter (D50) of 0.8 to 60 μm can be regarded as being generally 50 volume % or more. Therefore, as the γ-alumina powder having a small particle size, one having a media diameter (D50) of 0.8 to 60 μm can be suitably used. Furthermore, in consideration of the fade resistance characteristics, the γ-alumina powder having a small particle size preferably has a median diameter of 10 to 46 μm, more preferably 20 to 36 μm, and most preferably 25 to 30 μm. In other words, the γ-alumina particles having a particle diameter in the range as mentioned above also work advantageously in the fade resistance characteristics.

When the content of the above-mentioned γ-alumina having a small particle size is 0.5 volume % or more of the friction material composition, the friction material exhibits a suitable friction coefficient and exhibits also excellent crack resistance and abrasion resistance. And, by setting it to 3 volume % or less, it is possible to avoid deterioration of wear resistance. Therefore, the content of γ-alumina having a small particle size is preferably 0.5 to 3.0 volume %, more preferably 1 to 2.5 volume %, and optimally 1.5 to 2 volume %. This corresponds to that the content of γ-alumina particles (fraction) having a particle diameter in a range of 0.8 to 60 μm is preferably 0.25 to 3.0 volume %, more preferably 0.5 to 2.5 volume %, and optimally 0.75 to 2 volume % of the friction material composition.

(γ-Alumina Powder Having a Median Diameter ($D_{50}$) of 80 to 400 μm)

The second γ-alumina powder used in the friction material composition of the present invention, that is, the γ-alumina powder having a large particle size is an active ingredient specialized for improving the fade resistance of the friction material, and mainly contains particles having a particle diameter in the range of 80 to 400 μm. When the particle diameter of the γ-alumina particles is 80 μm or more, they exhibit very good bite into the disc rotor, and the fade resistance characteristics of the friction material are enhanced. However, if the particle size is too large, the aggression to the disc rotor becomes excessive and wear of the disc rotor is promoted. Accordingly, the γ-alumina particles having a particle diameter in the range of 80 to 400 μm are an advantageous element that is possible to favorably exhibit biting into the disc rotor (namely, to improve the fade resistance characteristics) and to concurrently suppress aggression. When the particle diameter is less than 80 μm, biting into the disk rotor decreases to a certain level and fade resistance characteristics at high temperature decreases. When the particle diameter is less than 0.8 μm, biting into the disk rotor further decreases and becomes extremely poor. Thus, in the second γ-alumina powder, γ-alumina particles having a particle diameter in the range of 80 to 400 μm preferably occupy approximately 50 volume % or more, and more preferably occupy approximately 75 volume % or more. It is optimum to use a fraction which is classified into a particle size range of 80 to 400 μm by sieving or the like. Similarly to the above description, when assuming a normal distribution type particle size distribution, the proportion of particles having a particle diameter in the range of 80 to 400 μm occupying a powder having a median diameter ($D_{50}$) of 80 to 400 μm can be regarded as being generally 50 volume % or more. Therefore, as the γ-alumina powder having a large particle size, one having a median diameter ($D_{50}$) of 80 to 400 μm can be suitably used. The γ-alumina having a large particle size preferably has a median diameter of 100 to 350 μm, more preferably 175 to 325 μm, and most preferably 200 to 300 μm.

When the content of the above-mentioned γ-alumina having a large particle size is 0.5 volume % or more of the friction material composition, the friction material exhibits a suitable friction coefficient and also exhibits excellent crack resistance and pedal feeling. And, by setting it to 2 volume % or less, it is possible to avoid deterioration of wear resistance. Therefore, the content of γ-alumina having a large particle size is preferably 0.5 to 2.0 volume %, more preferably 0.75 to 1.75 volume %, and optimally 1 to 1.5 volume %. This corresponds to that the content of γ-alumina particles (fraction) having a particle diameter in a range of 80 to 400 μm is preferably 0.25 to 2.0 volume %, more preferably 0.37 to 1.75 volume %, and optimally 0.5 to 1.5 volume % of the friction material composition.

The larger the difference between the median diameters ($D_{50}$) of the two kinds of γ-alumina powders to some extent, the effects of the γ-alumina powder having a large particle size and the γ-alumina powder having a small particle size act synergistically so that the respective efficacies are more effectively exhibited. In this respect, it is preferred that the difference in median diameter between the γ-alumina powder having a large particle size and the γ-alumina powder having a small particle size is 139 μm to 305 μm. When the difference in median diameter between the γ-alumina powder having a large particle size and the γ-alumina powder having a small particle size is 139 μm or more, the friction coefficient of the friction material shows a suitable value, and the fade resistance characteristics are good. Further, when the difference in median diameter is 305 μm or less, it is possible to avoid deterioration in build-up of friction coefficient. More preferably, the difference in median diameter between the γ-alumina powder having a large particle size and the γ-alumina powder having a small particle size may be 180 μm to 260 μm. In other words, it can be said that it is preferable that fewer particles are classified in the area between the range of 0.8 μm to 60 μm and the range of 80 μm to 400 μm in the particle size distribution of the powder. Based on this viewpoint, the proportion of γ-alumina particles (fraction) having a particle diameter of more than 60 μm and less than 80 μm, relative to the total amount of the γ-alumina powders blended in the friction material composition, is preferably 15 volume % or less, and more preferably 10 volume % or less. Then it is preferable that, with respect to the total amount of the γ-alumina powders contained in the friction material composition, the proportion occupied by the fraction classified to the particle diameter of 0.8 to 60 μm is 30 to 70 volume % and the proportion occupied by the fraction classified to the particle diameter of 80 to 400 μm is 30 to 70 volume %. The γ-alumina particles (fraction) having a particle diameter of more than 60 μm and less than 80 μm tend to reduce the synergistic effect obtained by the use in combination of the first γ-alumina powder and the second γ-alumina powder. From the viewpoint of the synergistic effect, the ratio of the γ-alumina fraction having a particle size of 0.8 to 60 μm to the γ-alumina fraction having a particle size of 80 to 400 μm is preferably from 3/7 to 7/3, and such a blend may be more preferable as being from 4/6 to 6/4.

The particle diameter and the median diameter ($D_{50}$) of the γ-alumina powder can be measured by using a method such as laser diffraction particle size distribution measurement or the like.

(Other Inorganic Filler)

Inorganic fillers are blended as a friction modifier for avoiding deterioration of heat resistance, abrasion resistance, friction coefficient, etc. of the friction material. In the present invention, as the inorganic filler, those used in ordinary friction material compositions other than the above-mentioned γ-alumina can be used in combination.

Examples of the inorganic filler other than γ-alumina include: carbon materials such as graphite and coke; metal sulfides such as antimony trisulfide, tin sulfide, molybdenum disulfide, bismuth sulfide and zinc sulfide; titanic acid salts such as potassium titanate, lithium potassium titanium oxide, sodium titanate, magnesium potassium titanate and the like; and various inorganic compounds such as calcium hydroxide, sodium carbonate, calcium carbonate, magnesium carbonate, barium sulfate, calcium sulfate, calcium oxide, titanium oxide, magnesium oxide, silica (silicon dioxide), α-alumina, triiron tetraoxide, zinc oxide, silicon carbide, and the like. In addition, dolomite, mica, vermiculite, talc, clay, zeolite, zircon (zirconium silicate), zirconia (zirconium oxide), mulita, chromite, garnet and the like can also be used as a filler in minerals. Further, as for the metal, iron, aluminum, nickel, and alloys composed of one or more thereof, and the like can also be used. Powders of the above-mentioned materials can be used alone or in combination of two or more. As for powders having different particle shapes like particulate potassium titanate and platy potassium titanate, etc., it can be used by appropriately selecting from them.

The content of the inorganic filler other than γ-alumina in the friction material composition of the present invention is preferably from 30 to 80 mass %, more preferably from 40 to 78 mass %, and optimally from 50 to 75 mass %. By setting the content of the inorganic filler other than γ-alumina in the range of 30 to 80 mass %, deterioration of heat resistance can be avoided.

(Binder)

The binder is a material to integrate the organic filler, the inorganic filler and the fibrous base material blended in the friction material composition, and to impart strength. The binder contained in the friction material composition of the present invention may be any thermosetting resin commonly used as a binder for a friction material, which can be used without particular limitation.

Examples of the thermosetting resin include phenolic resins, elastomer-dispersed phenol resins, modified phenolic resins, and the like. More specifically, as the elastomer-dispersed phenolic resin, various types of elastomer-dispersed phenolic resins such as acrylic elastomer-dispersed phenolic resins and silicone elastomer-dispersed phenolic resins can be used. As the modified phenolic resin, various modified phenolic resins such as acryl-modified phenolic resins, silicone-modified phenolic resins, cashew-modified phenolic resins, epoxy-modified phenolic resins, alkylbenzene-modified phenolic resins and the like can be used. These thermosetting resins can be used alone or in combination of two or more. Among these thermosetting resins, it is preferable to use a phenolic resin, an acryl-modified phenolic resin, a silicone-modified phenolic resin or alkylbenzene-modified phenolic resin, in particular, because they impart good heat resistance, formability and friction coefficient.

The content of the binder in the friction material composition of the present invention is preferably from 5 to 20 mass %, and more preferably from 5 to 10 mass %. When the content of the binder is in the range of 5 to 20 mass %, it is possible to further suppress the decrease in the strength of the friction material. And, since the porosity of the friction material is decreased, the squeaking generated by the increase in elastic modulus can be suppressed and deterioration of the noise and vibration performance can be prevented.

(Organic Filler)

The organic filler is blended as a friction modifier for improving the noise and vibration performance, wear resistance and the like of the friction material.

There are no particular restrictions on the organic filler that can be used in the friction material composition of the present invention as long as it can exhibit the above performance, and it is possible to use cashew dust, rubber component and the like which are ordinarily used as an organic filler.

Cashew dust is obtained by pulverizing a cured product of cashew nut shell oil, and one usually used for a friction material may be used in the friction material composition of the present invention. Examples of the rubber component include natural rubber, acrylic rubber, isoprene rubber, polybutadiene rubber (BR), nitrile-butadiene rubber (NBR), styrene-butadiene rubber (SBR), and the like. These can be used alone or in combination of two or more. Also, cashew dust and rubber component may be used in combination, or cashew dust coated with rubber component may be used. From the viewpoint of noise and vibration performance, it is preferable to use cashew dust and a rubber component in combination as the organic filler.

The content of the organic filler in the friction material composition of the present invention is preferably from 1 to 20 mass %, more preferably from 1 to 10 mass %, and optimally from 3 to 8 mass %. By setting the content of the organic filler in the range of 1 to 20 mass %, it is possible to avoid deterioration of the noise and vibration performance due to squeaking or the like accompanying increase in elastic modulus of the friction material, and deterioration of strength due to thermal history can be avoided.

When the cashew dust and the rubber component are used in combination, the ratio of the cashew dust to the rubber component is preferably 2/1 to 10/1 (mass ratio), more preferably 3/1 to 9/1 (mass ratio), and most preferably 3/1 to 8/1 (mass ratio).

(Fibrous Base Material)

The fibrous base material exhibits a reinforcing action such as improvement of mechanical strength in the friction material. Examples of the fibrous base material used in the present invention include inorganic fibers, metal fibers, organic fibers, carbon-based fibers and the like, which can be used alone or in combination of two or more. Incidentally, it is noted that the inorganic fibers, here, means fibers of inorganic materials as described below, excluding metal fibers and carbon fibers.

Inorganic fibers include ceramic fibers, bio-soluble ceramic fibers, mineral fibers, glass fibers, and the like. These inorganic fibers can be used alone or in combination of two or more.

Mineral fibers are classified into natural mineral fibers and artificial mineral fibers. Here, the mineral fibers means artificial mineral fibers such as slag wool, basalt fiber, and the like, which are obtained by melt-spinning a raw material mainly composed of blast furnace slag, basalt, or other natural rock, etc. Specifically, it is possible to use those containing components of $SiO_2$, $Al_2O_3$, CaO, MgO, FeO, $Na_2O$, etc., or those containing one of these components or two or more in combination. Preferably, those containing Al element (that is, containing $Al_2O_3$ component) may be used as the mineral fiber. In other words, it is preferably an artificial mineral fiber obtained by fiberizing a natural mineral containing Al element as a raw material. As the average fiber length of the whole mineral fibers contained in the friction material composition increases, the adhesive strength with each component in the friction material composition tends to decrease. Therefore, it is preferable that the average fiber length of the whole mineral fibers is 500 μM or less. More preferably, the average fiber length is 100 to 400 μm. It is noted that the "average fiber length" here is a value obtained by selecting 50 mineral fibers randomly, measuring the fiber lengths of them with an optical microscope, and calculating the average thereof.

Artificial mineral fibers also include such fibers as potassium titanate fibers, silicate fibers, wollastonite, etc. Potassium titanate fibers and the like are concerned about oral suction to the human body. In view of the above, it is preferable, in the present invention, to use a bio-soluble mineral fiber in consideration of the influence on the human body and the reduction of environmentally harmful substances. The bio-soluble mineral fiber is an artificial mineral fiber having a characteristic that, even if it is taken into a human body, it dissolves and is discharged to the outside of the body in a short time. Specifically, it shows fibers having a chemical composition in which the total amount of alkali oxides and alkaline earth oxides (total amount of oxides of sodium, potassium, calcium, magnesium, barium) is 18 mass % or more, and satisfying the predetermined requirements in short-term bio persistence test by respiration, intraperitoneal test or long-term respiration test. The requirement in each test is, specifically, that the mass half-life of 20 or more fibers is within 40 days in short-term bio-persistence test by respiration, that there is no evidence of excessive carcinogenicity in the intraperitoneal test, and that there is no associated pathogenicity, tumorigenesis, etc. in the long term respiration test (Nota Q (Excluded carcinogenic application) of EU Directive 97/69/EC). Examples of such bio-soluble mineral fibers include $SiO_2$—$Sl_2O_3$—$CaO$—$MgO$—$FeO$—$Na_2O$ fibers and the like, and it is possible to use fibers containing the components of $SiO_2$, $Al_2O_3$, $CaO$, $MgO$, $FeO$, $Na_2O$, etc. in any combination and proportion. These are also called bio-soluble ceramic fiber, and examples of commercially available products include Roxul series manufactured by LAPINUS FIBRES B.V. The "Roxul" contains $SiO_2$, $Al_2O_3$, $CaO$, $MgO$, $FeO$, $Na_2O$, etc.

As the metal fiber, it is possible to use, for example, a fiber obtained by fiberizing a single metal such as aluminum, iron, zinc, tin, titanium, nickel, magnesium, silicon and the like, or its alloy. Fibers of metals other than copper and copper alloy may be used as the metal fiber. Such metal fibers can be used singly or in combination of two or more, and they are effective for improving the friction coefficient and imparting crack resistance.

From the viewpoint of wear resistance, the content of the metal other than copper and copper alloy is preferably in the range of 0.5 mass % or less of the friction material composition of the present invention, and it is more preferable not to blend metal fibers (content being 0 mass %) other than copper and copper alloy Organic fibers are used for the purpose of improving crack resistance and abrasion resistance. As the organic fiber, for example, aramid fiber, cellulose fiber, acrylic fiber, phenolic resin fiber (having a crosslinked structure) and the like can be used.

The carbon-based fibers are fibrous base materials obtained by burning a polymer fiber to advance carbonization, and specifically, fibrous pitch-based carbon fiber, polyacrylonitrile (PAN)-based carbon fiber, activated carbon fiber and the like can be given. The carbon-based fibers also include flame-resistant fibers, and the flame-resistant fibers are fibers obtained by a frame resisting treatment which is an initial stage of burning to produce the carbon-based fibers.

The organic fibers and carbon-based fibers can be used alone or in combination of two or more. From the viewpoint of abrasion resistance, it is preferable to use aramid fiber as the organic fiber.

The content of the fibrous base material in the friction material composition of the present invention is preferably 5 to 40 mass %, more preferably 5 to 20 mass %, and optimally 5 to 10 mass % in terms of the total amount including the metal fiber of copper or copper alloy. By setting the content of the fibrous base material in the range of 5 to 40 mass %, it is possible to achieve an appropriate porosity as a friction material. Therefore, the occurrence of squeaking and the like due to the increase in elastic modulus is possibly avoided, and deterioration of noise and vibration performance can be suppressed. In addition, appropriate material strength and abrasion resistance can be achieved, and formability can also be improved.

(Other Materials)

In addition to the aforementioned binder, organic filler, inorganic filler and fibrous base material, other materials can be blended as necessary to the friction material composition of the present invention. For example, from the viewpoint of abrasion resistance, a fluoropolymer such as PTFE (polytetrafluoroethylene) can be blended into the friction material composition of the present invention as an organic additive.

[Friction Material]

The friction material composition of the present invention is obtained by blending the respective materials based on the above description, and the friction material is obtained by subjecting the friction material composition to thermoforming and thermal curing. The friction material can be applied to a friction member such as a disc break pad and a brake lining used for a vehicle such as an automobile, etc. The friction material produced from the above-mentioned friction material composition is excellent in fade resistance characteristics at high temperature and is excellent in pedal feeling characteristics during braking, and it is suitable for friction material for automobiles.

The production of the friction material can be carried out by molding the friction material composition in the manner which is generally used, preferably by hot pressing of the friction material composition. Specifically, the friction material composition of the present invention is prepared into a uniform mixture using a mixer such as a Loedige mixer, a pressure kneader, an Eirich mixer or the like, and the mixture is preliminarily molded using a molding die. The preliminarily molded product thus obtained is subjected to heating and pressing molding for 4 to 10 minutes at a molding temperature of 140 to 160° C. and a molding pressure of 15 to 50 MPa, and the molded product thus obtained is further heated at 180 to 250° C. for 2 to 10 hours, to obtain a friction material. Further, painting, scorch treatment, or polishing treatment can be applied to the friction material, if necessary.

[Friction Member]

The friction member is formed by laminating the friction material on the backing metal, and the surface of the friction material is brought into pressure contact with a mating member such as a brake rotor or the like, to brake the mating member with the surface of the friction material as a friction surface. The friction material may be laminated directly on the backing metal or may be laminated via an intermediate layer between the backing metal and the friction material. Examples of the intermediate layer include a primer layer for the purpose of surface modification for enhancing the adhesion effect of the backing metal, an adhesive layer for bonding the backing metal and the friction material, and the like.

The friction material composition of the present invention is excellent in fade resistance characteristics at a high temperature and has a good peal feeling characteristics during braking, so it can be molded to use as an "under layer material" of a friction member.

It is noted that the "under layer material" is a material constituting a layer interposed between the friction material serving as the friction surface of the friction member and the backing metal, and it is provided for the purpose of improving the shear strength in the vicinity of the bonded portion between the friction material and the backing metal, and for the crack resistance. Correspondingly, the friction material which constitutes the friction surface of the friction member is called "over layer material".

Example

Examples and Comparative Examples (Production of Disc Brake Pad)

Materials were blended according to the formulation ratios shown in Tables 1 and 2 to obtain friction material compositions of Examples 1 to 7 and Comparative Examples 1 to 3.

Each friction material composition was mixed with a Loedige mixer (product name: Loedige mixer M20, manufactured by MATSUBO Corporation) and was preliminarily molded with a molding press (manufactured by Oji Kikai Kogyo Co., Ltd.). It is noted that the γ-alumina 1 was a powder having a median diameter (D50) of 28 μm, and the γ-alumina 2 was a powder having a median diameter (D50) of 250 μm. The obtained preliminary molded article was hot press-molded together with a backing metal made of iron (product of Hitachi Automotive Systems, Ltd.) under the conditions of a molding temperature of 145° C., a molding pressure of 30 MPa and a molding time of 5 minutes, using a molding press. The obtained molded article was heat-treated at 220° C. for 5 hours, polished using a rotary polishing machine, and subjected to scorching treatment at 500° C. In this manner, dis brake pads of Examples 1 to 7 and Comparative Examples 1 to 3 were obtained. In Examples 1 to 7 and Comparative Examples 1 to 3, the thickness of the backing metal was 5 mm and the thickness of the friction material was 11 mm, and the disc brake pads were produced to have a friction material projected area of 50 cm$^2$.

For each sample of the produced disc brake pad, a test was conducted to evaluate the friction coefficient and pedal feeling characteristics according to the following procedure. The test results are shown together in Tables 1 and 2, and the evaluation of friction coefficient and pedal feeling characteristics is described below. The details of each material described in Tables 1 and 2 are as follows, and the median diameter of the powder has been measured using a laser diffraction/scattering particle size distribution measuring apparatus (product name: LA-920, manufactured by HORIBA, Ltd.).

(Binder)

Phenolic resin A: manufactured by Sumitomo Bakelite Co., Ltd. (product name: Sumilite Resin PR-54529)

Phenolic resin B: manufactured by Sumitomo Bakelite Co., Ltd. (product name: Sumilite Resin PR-55291)

(Organic Filler)

NBR powder: provided by Sanyo Trading Co., Ltd. (product name: TPA)

Isoprene rubber: provided by Sanyo Trading Co., Ltd. (product name: LIR30)

Cashew dust: manufactured by Tohoku Chemical Industries, Ltd. (product name: FF-1056, maximum particle size: 500 μm)

(Inorganic Filler)

Graphite: manufactured by Nippon Graphite Trading Co., Ltd. (product name: F15)

Metal sulfide: manufactured by RIMSA METAL TECHNOLOGY S.A. (product name: EnviroLube)

Antimony trisulfide: manufactured by Chemetal (Austria) (product name: Frixter)

α-alumina: manufactured by Showa Denko K.K. (product name: A-31, Mohs hardness: 8 to 9)

γ-alumina 1: manufactured by Mizusawa Industrial Chemicals, Ltd. (product name: Neobead GP-20, median diameter (D10): 5.31 μm, median diameter (D90): 59.9 μm, fraction content of particle size 0.8 to 60 μm: 89.6% or more)

γ-alumina 2: manufactured by Mizusawa Industrial Chemicals, Ltd. (product name: Neobead MSC #300, fraction content of particle size 80 to 400 μm: 99% or more)

Zirconium oxide: manufactured by DAIICHI KIGENSO KAGAKU KOGYO CO., LTD. (product name: BR90G)

Lithium potassium titanium oxide: manufactured by Otsuka Chemical Co., Ltd. (product name: TERRACESS LSS)

Mica: provided by Imerys Specialities Japan Co., Ltd. (product name: 40S)

Barium sulfate: manufactured by SAKAI CHEMICAL INDUSTRY CO., LTD. (product name: barium sulfate BA)

Calcium hydroxide: manufactured by Chichibu Lime Industry CO., LTD. (product name: SA-149)

(Fibrous Base Material)

Aramid fiber: manufactured by Du Pont-Toray Co., Ltd. (product name: 1F538)

Mineral fiber: manufactured by LAPINUS FIRERS B.V. (product name: RB240)

Evaluation of Friction Coefficient:

In accordance with the Japanese Automotive Standards Organization JASO C406, the second effectiveness test (normal braking), the second fade test (during high load braking) and the third effectiveness test (after undergoing a heat history) were carried out, and the average value of friction coefficient in each of the second effectiveness test and the third effectiveness test was calculated. Further, the min-min μ value of friction coefficient in the second fade test (the minimum value of friction coefficient from the stat of braking until 0.5 seconds before the vehicle stopped) was evaluated as the friction coefficient at the time of high load braking. Those having a value of 0.40 or more in the third effectiveness test and those having a min-min μ value of 0.30 or more can be evaluated as having a good friction coefficient.

Relative Value of Friction Coefficient:

In the tests for evaluating the friction coefficient described above, the second fade test has been performed between the second effectiveness test and the third effectiveness test. Therefore, by comparing the friction coefficient in the second effectiveness test with the resultant friction coefficient in the third effectiveness test, it is possible to evaluate the fluctuation of the friction coefficient before and after undergoing the heat history. Accordingly, the relative value of the friction coefficient in the third effectiveness test to the friction coefficient in the second effectiveness test has been calculated. Those having a relative value of 90% or more can be evaluated as being good in terms of stability of the friction coefficient before and after undergoing the heat history, and those having a relative value of 95 to 105% can be regarded as excellent.

Pedal Feeling Characteristics:

Build-up property of μ value and time from the start of braking to stabilization were calculated at normal braking (initial speed: 80 km/h, final speed: 60 km/h, hydraulic pressure: 2 MPa, temperature before breaking: 100° C.), which was equivalent to actual vehicle, and the pedal feeling characteristics were evaluated. Regarding the evaluation, those suffering no deterioration in the build-up of the friction coefficient (μ value) during braking, and those with a short time of 0.1 second or less until the friction coefficient becomes stable from the start of braking can be evaluated as being good in the pedal feeling characteristics.

TABLE 1

| | | | Example | | | | |
|---|---|---|---|---|---|---|---|
| | | | 1 | 2 | 3 | 4 | 5 |
| Friction material composition (vol %) | Binder | Phenolic resin A | 9.0 | 9.0 | 9.0 | 9.0 | 9.0 |
| | | Phenolic resin B | 9.0 | 9.0 | 9.0 | 9.0 | 9.0 |
| | Organic filler | NBR powder | 2.0 | 2.0 | 2.0 | 2.0 | 2.0 |
| | | Isoprene rubber | 1.0 | 1.0 | 1.0 | 1.0 | 1.0 |
| | | Cashew dust | 15.0 | 15.0 | 15.0 | 15.0 | 15.0 |
| | Inorganic filler | Graphite | 3.7 | 3.7 | 3.7 | 3.7 | 3.7 |
| | | Metal sulfide | 0.9 | 0.9 | 0.9 | 0.9 | 0.9 |
| | | Antimony trisulfide | 1.3 | 1.3 | 1.3 | 1.3 | 1.3 |
| | | α-alumina | 0.2 | 0.2 | 0.2 | 0.2 | 0.2 |
| | | γ-alumina 1 median diameter: 28 μm | 1.7 | 0.9 | 2.5 | 3.0 | 1.7 |
| | | γ-alumina 2 median diameter: 250 μm | 0.8 | 0.8 | 0.8 | 0.8 | 0.5 |
| | | Zirconium oxide | 7.4 | 7.4 | 7.4 | 7.4 | 7.4 |
| | | Lithium potassium titanium oxide | 14.2 | 14.2 | 14.2 | 14.2 | 14.2 |
| | | Mica | 4.8 | 4.8 | 4.8 | 4.8 | 4.8 |
| | | Barium sulfate | 15.0 | 15.8 | 14.2 | 13.7 | 15.3 |
| | | Calcium hydroxide | 4.0 | 4.0 | 4.0 | 4.0 | 4.0 |
| | Fibrous base material | Aramid fiber | 5.0 | 5.0 | 5.0 | 5.0 | 5.0 |
| | | Mineral fiber | 5.0 | 5.0 | 5.0 | 5.0 | 5.0 |
| Effectiveness characteristics | Friction coefficient | Second effectiveness test | 0.49 | 0.48 | 0.51 | 0.52 | 0.47 |
| | | Third effectiveness test | 0.47 | 0.44 | 0.48 | 0.49 | 0.43 |
| | | min − min μ value | 0.31 | 0.31 | 0.31 | 0.31 | 0.30 |
| | Relative value of friction coefficient (%) | $\frac{\text{Third effectiveness}}{\text{Second effectiveness}} \times 100$ | 96 | 92 | 94 | 94 | 91 |
| Pedal feeling characterstics | | Deterioration in build-up of μ | No | No | No | No | No |
| | | Time to stabilization of μ (sec) | 0.01 | 0.01 | 0.01 | 0.01 | 0.01 |

TABLE 2

| | | | Example | | Comparative Example | | |
|---|---|---|---|---|---|---|---|
| | | | 6 | 7 | 1 | 2 | 3 |
| Friction material composition (vol %) | Binder | Phenolic resin A | 9.0 | 9.0 | 9.0 | 9.0 | 9.0 |
| | | Phenolic resin B | 9.0 | 9.0 | 9.0 | 9.0 | 9.0 |
| | Organic filler | NBR powder | 2.0 | 2.0 | 2.0 | 2.0 | 2.0 |
| | | Isoprene rubber | 1.0 | 1.0 | 1.0 | 1.0 | 1.0 |
| | | Cashew dust | 15.0 | 15.0 | 15.0 | 15.0 | 15.0 |
| | Inorganic filler | Graphite | 3.7 | 3.7 | 3.7 | 3.7 | 3.7 |
| | | Metal sulfide | 0.9 | 0.9 | 0.9 | 0.9 | 0.9 |
| | | Antimony trisulfide | 1.3 | 1.3 | 1.3 | 1.3 | 1.3 |
| | | α-alumina | 0.2 | 0.2 | 0.2 | 0.2 | 0.2 |
| | | γ-alumina 1 median diameter: 28 μm | 1.7 | 1.7 | — | — | 1.7 |
| | | γ-alumina 2 median diameter: 250 μm | 1.2 | 1.6 | — | 0.8 | — |
| | | Zirconium oxide | 7.4 | 7.4 | 7.4 | 7.4 | 7.4 |
| | | Lithium potassium titanium oxide | 14.2 | 14.2 | 14.2 | 14.2 | 14.2 |
| | | Mica | 4.8 | 4.8 | 4.8 | 4.8 | 4.8 |
| | | Barium sulfate | 14.6 | 14.2 | 14.2 | 14.2 | 14.2 |
| | | Calcium hydroxide | 4.0 | 4.0 | 4.0 | 4.0 | 4.0 |
| | Fibrous base material | Aramid fiber | 5.0 | 5.0 | 5.0 | 5.0 | 5.0 |
| | | Mineral fiber | 5.0 | 5.0 | 5.0 | 5.0 | 5.0 |
| Effectiveness characteristics | Friction coefficient | Second effectiveness test | 0.50 | 0.53 | 0.52 | 0.46 | 0.45 |
| | | Third effectiveness test | 0.48 | 0.50 | 0.37 | 0.40 | 0.39 |
| | | min − min μ value | 0.31 | 0.31 | 0.29 | 0.29 | 0.29 |
| | Relative value of friction coefficient (%) | $\frac{\text{Third effectiveness}}{\text{Second effectiveness}} \times 100$ | 96 | 94 | 88 | 87 | 87 |
| Pedal feeling characterstics | | Deterioration in build-up of μ | No | No | Little | No | No |
| | | Time to stabilization of μ (sec) | 0.01 | 0.01 | 0.02 | 0.02 | 0.01 |

(Coefficient of Friction)

From Table 1, it can be seen that the sample of Example 1 has high friction coefficient in both of the second and third effectiveness tests, and that the relative value of the friction coefficient in the third effectiveness test compared with the friction coefficient in the second effectiveness test is 96%. Thus it can be seen that the change is small. Also in Examples 2 to 7, a high coefficient of friction is achieved in both the second effectiveness test and the third effectiveness test, and the relative value of the friction coefficient exceeds 90%. On the other hand, in each of the samples of Comparative Examples 1 to 3, the value in the third effectiveness test is low, and the relative value of the friction coefficient in the third effectiveness test compared with the friction coefficient in the second effectiveness test is 89%. Thus the change is large.

Furthermore, when comparing the results of Comparative Examples 1 to 3 with each other, the friction coefficient in comparative Example 1 is particularly low in both the second effectiveness test and the third effectiveness test. In consideration of this point, it can be regarded that a certain effect in improving the friction coefficient is obtained in the case where the γ-alumina 1 or the γ-alumina 2 is incorporated singly (Comparative Examples 1 and 3), and that the friction coefficient increases synergistically when they are compounded in combination (Examples 1 to 7). With respect to the relative value of the friction coefficient, no efficacy is observed when the γ-alumina 1 or the γ-alumina 2 is blended alone. Therefore, it can be said that suppression of fluctuation in friction coefficient is an effect by using the γ-alumina 1 and the γ-alumina 2 in combination.

(Pedal Feeling Characteristics)

In the samples of Examples 1 to 7, there is no deterioration in the build-up of the friction coefficient during braking. Contrastively, in the sample of Comparative Example 1, deterioration occurred in the build-up of the friction coefficient during braking.

FIG. 1 shows changes in the friction coefficient (μ) from the braking start point in the samples of Example 1 and comparative Example 1. FIG. 1(a) shows the case of Example 1 and FIG. 1(b) shows the case of Comparative example 1. When the time from the start of braking until the friction coefficient (μ) becomes stable is obtained from FIG. 1, it is 0.01 second in the sample of Example 1, but it is 0.02 seconds in the sample of Comparative Example 1. Thus it can be seen that the time of stabilization from the start of braking is shorter in the sample of Example 1.

Also in Examples 2 to 7, the time until the friction coefficient (μ) is stabilized is as short as in Example 1. However, it is also short in comparative Example 3 in which the γ-alumina 1 is blended. From this fact, it can be said that blending of γ-alumina 1 is effective for stabilizing the friction coefficient.

INDUSTRIAL APPLICABILITY

According to the friction material composition of the present invention, it is possible to obtain a friction material which has no risk of adversely affecting the environment, which is excellent in fade resistance at high temperature, and which has good pedal feeling characteristics during braking. Therefore, it can be suitably applied to friction materials for automobiles.

The invention claimed is:

1. A friction material composition, comprising: a binder; a fibrous base material; an inorganic filler; and an organic filler, and containing no copper or having a copper content of 0.5 mass % or less,
wherein the inorganic filler comprises two γ-alumina powders of a first γ-alumina powder having a median diameter ($D_{50}$) of 0.8-60 μm, and a second γ-alumina powder having a median diameter ($D_{50}$) of 80-400 μm, and
wherein the first γ-alumina powder contains a fraction classified to a particle diameter of 0.8 to 60 μm at a ratio of 50 volume % or more, and the second γ-alumina powder contains a fraction classified to a particle diameter of 80 to 400 μm at a ratio of 50 volume % or more.

2. The friction material composition as set forth in claim 1, wherein a content of the first γ-alumina powder is 0.5 to 3.0 volume % and a content of the second γ-alumina powder is 0.5 to 2.0 volume %.

3. The friction material composition as set forth in claim 1, wherein a difference in the median diameter ($D_{50}$) between the first γ-alumina powder and the second γ-alumina powder is 139 to 305 μm.

4. The friction material composition as set forth in claim 1, wherein the content of a fraction of γ-alumina classified to a particle diameter of 0.8 to 60 μm is 0.25 to 3.0 volume % of the friction material composition, and the content of a fraction of γ-alumina classified to a particle diameter of 80 to 400 μm is 0.25 to 2.0 volume % of the friction material composition.

5. The friction material composition as set forth in claim 1, wherein the ratio of a fraction classified to a particle diameter of 0.8 to 60 μm is 10 to 90 volume % and the ratio of a fraction classified to a particle diameter of 80 to 400 μm is 10 to 90 volume %, to the total amount of the γ-alumina powders contained in the friction material composition.

6. The friction material composition as set forth in claim 1, wherein the ratio of a fraction of γ-alumina having a particle diameter exceeding 60 μm and less than 80 mμ is 20 volume % or less to the total amount of the γ-alumina powders contained in the friction material composition.

7. A friction material produced by a process comprising molding the friction material composition as set forth in claim 1.

8. The friction material composition, comprising: a binder; a fibrous base material; an inorganic filler; and an organic filler, and containing no copper or having a copper content of 0.5 mass % or less,
wherein the inorganic filler comprises two γ-alumina powders of a first γ-alumina powder having a median diameter ($D_{50}$) of 0.8-60 μm, and a second γ-alumina powder having a median diameter ($D_{50}$) of 80-400 μm, and
wherein the ratio of a fraction of γ-alumina having a particle diameter exceeding 60 μm and less than 80 mμ is 20 volume % or less to the total amount of the γ-alumina powders contained in the friction material composition.

9. The friction material composition as set forth in claim 8, wherein a content of the first γ-alumina powder is 0.5 to 3.0 volume % and a content of the second γ-alumina powder is 0.5 to 2.0 volume %.

10. The friction material composition as set forth in claim 8, wherein a difference in the median diameter ($D_{50}$) between the first γ-alumina powder and the second γ-alumina powder is 139 to 305 μm.

11. The friction material composition as set forth in claim 8, wherein the content of a fraction of γ-alumina classified to a particle diameter of 0.8 to 60 μm is 0.25 to 3.0 volume % of the friction material composition, and the content of a fraction of γ-alumina classified to a particle diameter of 80 to 400 μm is 0.25 to 2.0 volume % of the friction material composition.

12. The friction material composition as set forth in claim 8, wherein the ratio of a fraction classified to a particle diameter of 0.8 to 60 μm is 10 to 90 volume % and the ratio of a fraction classified to a particle diameter of 80 to 400 μm is 10 to 90 volume %, to the total amount of the γ-alumina powders contained in the friction material composition.

13. A friction material produced by a process comprising molding the friction material composition as set forth in claim 8.

* * * * *